United States Patent [19]

Dani

[11] 4,353,766

[45] Oct. 12, 1982

[54] LIGHT AND HEAT REFLECTING SURFACE

[75] Inventor: Mahesh J. Dani, Newtown, Pa.

[73] Assignee: Dunmore Corporation, Newtown, Pa.

[21] Appl. No.: 150,932

[22] Filed: May 19, 1980

[51] Int. Cl.³ .................... B44C 31/00; B32B 31/00
[52] U.S. Cl. .................................... 156/233; 156/238;
  156/249; 156/235; 156/289; 428/480
[58] Field of Search ............... 428/480, 485, 484, 458,
  428/432, 344; 156/233, 249, 231, 238, 235, 289

[56] References Cited

U.S. PATENT DOCUMENTS

| | | | |
|---|---|---|---|
| 3,589,962 | 6/1971 | Bonjour | 156/233 |
| 3,775,226 | 11/1973 | Willdorf | 428/458 |
| 3,949,139 | 4/1976 | Dunning et al. | 428/458 |

FOREIGN PATENT DOCUMENTS 7900103 3/1979 ............................................. 156/233

*Primary Examiner*—Marion McCamish
*Assistant Examiner*—E. Rollins Buffalow
*Attorney, Agent, or Firm*—B. Max Klevit

[57] ABSTRACT

A coated plastic film for application to a glass surface in the production of thermally insulating glass pane having light transmitting properties comprising, a release coating on the surface of said plastic film, an acrylic nitrocellulose lacquer applied over said release coating, and a vapor deposited metal coating applied over said lacquer.

2 Claims, 2 Drawing Figures

LIGHT AND HEAT REFLECTING SURFACE

FIELD OF THE INVENTION

The present invention relates to the production of thermally-insulating glass surfaces and is particularly concerned with the provision of film products for use in applying a reflective coating onto glass via lamination.

BACKGROUND OF THE INVENTION

An untreated flat glass surface reflects generally less than about 5% of the incident visible light. Its light reflective properties are known to be increased by application of a metallic or other coating to the surface. Special light- and heat-reflecting glasses have been manufactured in the past for glazing residential and industrial building structures as well as for window-equipped refrigeration and frozen product display units. Certain of these glasses are made or treated so as to reflect part of the visible light and to transmit another part. This type of glass will act as a mirror when looking at it from a lighted area to a darker space. Light transmission therethrough is good, however, when looking at it from a darker area to a brighter space.

Ceramic coatings were initially applied to glass as shields to protect personnel from intense long wave radiation and subsequently such ceramic coatings were developed for use on window glass. The transmittance for both visible and total solar radiation by such glasses can be varied over a fairly wide range.

Selective reflective coatings have also been applied to glass by vacuum evaporation of metals directly onto the glass surface. Such application involves an expensive batch process. Another known method for applying a selective coating to a glass surface is by chemical precipitation thereon of a film of such metals as iron, cobalt or nickel. This method is also quite costly and presents considerable difficulty in control of the extent of light transmission.

Preformed plastic sheets having opacifying or light-reflecting materials incorporated therein or applied to the surface of the plastic sheet, may be affixed to a glass surface to modify its light-transmitting properties.

SUMMARY OF THE INVENTION

In accordance with the present invention a preformed plastic sheet is initially provided with a release coating on the surface and overcoated with a metallizable lacquer. To the so coated surface a fine layer of vapor deposited aluminum of controlled thickness is adhered. By adhesively attaching the thus prepared plastic sheet to a flat glass surface, the plastic sheet can be stripped from the glass leaving an aluminum layer with protective coatings adhered to the glass. By carefully controlling the thickness of the applied aluminum deposit, the degree of light transmission through the coated glass is prefixedly controlled. Moreover, the preparation of the coated glass is adapted to be practiced by a semi-continuous process. Metals other than aluminum can be similarly applied.

DETAILED DESCRIPTION

Figure 1:
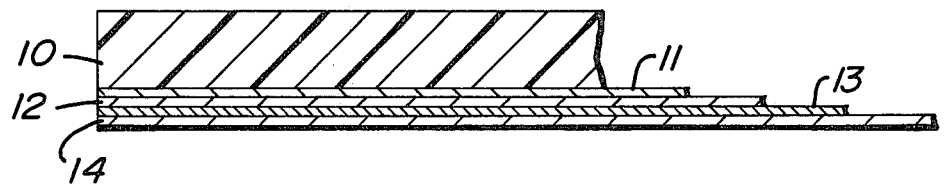
FIG. 1 of the accompanying drawings is an exaggerated schematic representation of an embodiment of the coated plastic sheet of the invention. The illustrated thickness of the component layers are not scaled in accordance with their relative dimensions.

The preformed plastic sheet, designated 10 in the drawings, may be any of the known or commercially available materials of suitable thickness affording facility in handling. It should not be so thin as to rumple easily nor so thick as to interfere with desired flexibility. In general a film sheet of about 50 to 200 gauge (about 12 to 50 micron) thickness is suitable. Among such commercially available plastic sheet materials those formed of polyester resins are preferred, such as those marketed as "Mylar" (duPont) and "Melinex" (I.C.I. Ltd.)

To one surface of sheet 10 there is applied a release coating 11, which may be any of the conventional compositions generally employed for this purpose, preferably of the dissolved wax type. Among such release coating compositions Ouricury wax has been found particularly suitable. Such wax has a relatively high melting point and provides a clear, transparent coat compatible with the various lacquers that are subsequently to be applied, as will hereinafter appear. The molten wax is admixed with volatile organic solvents preferably at about 0.13% solids. The obtained solution may be applied by any conventional coating means, such as by a padding roller or doctor blade. The layer of applied wax need not be very thick, preferably at about 0.0055 microns or generally in the range of from a monomolecular layer to 0.1 microns.

By evaporation of the solvent from the wax coated plastic sheet, the layer of wax remains thereon. This wax layer is next overcoated with a suitable lacquer 12, preferably with an acrylic nitrocellulose lacquer having solids current of 10 to 30%. The lacquer is generally applied at a thickness of 1.0 to 2.0 microns.

Over the lacquer coating on the plastic sheet a fine layer of aluminum 13 is applied by a vacuum deposition method well known in the production of metalized polyester resin film. Such methods are described, for example, in Modern Plastics Encyclopedia (1979-1980) at pages 449 and following. In the preferred method the aluminum metal is vaporized by heating in a high vacuum chamber and the produced metal vapor is condensed on the surface of the plastic sheet or running web of the plastic passed through the vapor field. If desired, instead of aluminum other metals, such as gold or silver, may be similarly applied in the practice of the invention.

To obtain the desired degree of light reflectance the uniformity and thickness of the deposited metal layer must be carefully controlled. Such control is had by regulating the rate at which the previously lacquered plastic sheet is passed through the field of vaporized metal and by the rate of energy input for evaporation of metal. In practice of the present invention products transmitting 10 to 80% of incident light therethrough are contemplated.

In preferred practice of the invention a protective coating is applied over the metallized surface in the form of a lacquer as indicated at 14. The lacquer preferably contains an incorporated ultraviolet inhibitor. Suitable lacquers for this purpose may comprise a polyester resin dissolved in one or more organic solvents. Any of the known U.V. stabilizers may be incorporated in the lacquer. The lacquer is applied by roller coating at a preferred thickness of about 1.25 microns. Alternatively, instead of a polyester resin based lacquer one comprising a pressure sensitive acrylic resin may be employed in coating 14. If a tinted product is desired, a compatible dye, such as one of yellow color, may be incorporated in either or both lacquer coatings 12 and 14.

Figure 2:
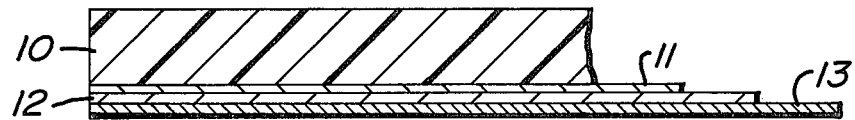
FIG. 2 is a similar representation of a modified embodiment.

The protective lacquer coating 14 may be omitted if so desired, as shown in the alternative modification of FIG. 2. Since the metalized web would be supplied as wound up in a roll with the metalized surface internally of the convolutions, the metalized surface would not be exposed in handling.

The coated plastic sheet 10 having thereon the described layers 11 to 13 or 14 may be furnished to the trade as rolled webs or as stacked sheets of desired dimension suitably packaged. For application to a glass surface any pressure sensitive adhesive may be employed which has good adherence to glass and which forms a clear transparent film thereon. Preferably one should employ an adhesive composition which in film form has a refractive index approximate to that of glass. The adhesive composition is sprayed on individual panes of glass and the aluminized plastic sheet is applied with the surface 13 or 14 facing the glass. The structure is dried in a low humidity oven. After the structure is fully dried, the plastic film 10 is peeled off the glass pane at the release layer 11, leaving the glass coated with the successive layers 14 through 11 in the embodiment of FIG. 1 or with only the coatings 13 through 11 in the embodiment of FIG. 2.

Suitable formulations for the release layer composition are illustrated by examples 1 to 3 below.

WAX SOLUTION—EXAMPLE 1

0.45 parts by weight of Ouricury wax are heated in a container to above melting point but below degradation temperature such as to a temperature of about 85° C. The solvent mixture is composed of

| Component | p.b.w. |
|---|---|
| Xylene | 202 |
| *Chlorothene NU | 136 |
| Methyl ethyl ketone (MEK) | 12 |

*Inhibited 1,1,1-trichloroethane (Dow Chemical Co.)

The solvent mixture is heated in a drum to 50° C. and the molten wax added to the drum and admixed. The obtained wax solution will contain about 0.13% solids and has a viscosity of 15.5±0.5 seconds in a #2 Zahn cup. It is applied by a 200 Q (Quadragravure) coating cylinder.

WAX SOLUTION—EXAMPLE 2

| Component | p.b.w. |
|---|---|
| Toluol | 227 |
| MEK | 92 |
| Cyclohexanone | 47 |
| Paraffin wax | 0.58 |

The wax solution will contain about 0.16% solids.

WAX SOLUTION—EXAMPLE 3

| Component | p.b.w. |
|---|---|
| Xylene | 202 |
| Chlorothene NU | 136 |
| MEK | 12 |
| Ouricury wax | 1.1 |

The molten wax is admixed with the warmed solvent following the same procedure as in Example 1. The solution contains about 0.31% solids.

Suitable formulations for the lacquer coating 12 are illustrated in Examples 4 and 5.

LACQUER COATING—EXAMPLE 4

| Component | p.b.w. |
|---|---|
| (1) A - 101 resin (40%) | 39 |
| MEK | 194 |
| Methyl isobutyl ketone | 56 |
| (2) Cellosolve | 12 |
| (3) Nitrocellulose RS 18-25 | 74 |

(1) Methyl methacrylate resin marketed by Rohm & Haas in its "Acryloid series", in MEK 40% solids.
(2) Brand of 2 ethoxy ethanol (Union Carbide).
(3) Intrinsic viscosity 1/16 second, 11.8–12.2% Nitrogen, 30% damp with isopropanol (Hercules).

The first four components are mixed until homogeneous and the nitrocellulose then added with continued mixing. The obtained lacquer contains about 18.0% solids and has a viscosity of 22–24 seconds as measured by a #2 Zahn cup. The lacquer is applied by a 150 Q coating cylinder, preferably using a smoothing bar for a smooth coated surface.

LACQUER COATING—EXAMPLE 5

| Component | p.b.w. |
|---|---|
| A - 101 resin (40%) | 71 |
| MEK | 177 |
| Cellosolve | 35.5 |
| Nitrocellulose RS 18-25 | 42.5 |
| (4) Elvacite 2013 | 9.5 |

(4) A low molecular weight methyl/n-butyl methacrylate copolymer marketed by duPont, having a typical inherent viscosity of 0.20 (of a solution containing 0.25 g polymer in 50 ml chloroform, measured at 25° C. using a No. 50 Cannon-Fenske viscosimeter).

The above prepared lacquer contains about 20.16% solids and has a viscosity of 23 to 27 seconds, as measured by a #2 Zahn cup.

Illustrative formulations for the preparation of the protective lacquer coating 14 are described in Examples 6 to 8.

PROTECTIVE LACQUER COATING—EXAMPLE 6

| Component | p.b.w. |
|---|---|
| (5) Polyester resin (32%) | 248 |
| Toluene | 141 |
| Methyl Cellosolve Acetate | 50 |
| (6) Uvinul D-50 | 5.7 |

(5) 32% resin dissolved in mixture of 1 part MEK/ 3 parts toluene + 5% Cellosolve acetate.
(6) U.V. stabilizer comprised of 2,2',4,4', tetrahydroxy - benzophenone (GAF)

The thinned lacquer has a viscosity of about 20 seconds as measured by a #2 Zahn cup, at 19.1% solids.

PRESSURE SENSITIVE ADHESIVE—EXAMPLE 7

| Component | p.b.w. |
|---|---|
| (7) Bostik 7518 solution | 125 |
| MEK | 70 |
| Toluol | 70 |
| MIBK | 70 |
| Uvinul D50 | 3.9 |

(7) Acrylic resin dissolved in toluol and MIBK containing approximately 40% solids, having consistency of heavy syrup (Brookfield 25° C.) 6000 to 9000 cps.

The resin solution and thinners are thoroughly admixed before adding the U.V. stabilizer. The thinned resin solution has a viscosity of 15–17 seconds (#3 Zahn cup) and contains 15.9% solids.

LACQUER COATING—EXAMPLE 8

| Component | p.b.w. |
|---|---|
| Polyester resin (30%) (Acid No. 50) | 275 |
| MEK | 36 |
| Toluol | 71.5 |

The foregoing formulation does not employ U.V. stabilizer and except for solvent proportions is largely similar to the composition in Example 6. Instead of the pressure sensitive adhesive composition of Example 7, other commercially available pressure sensitive adhesive compositions may be employed for the coating 14. Among these, particular mention is made of Gelva Multipolymer Solution 263 (Monsanto) of the acrylic resin solution type, which cures when the solvent is driven off; various brands of pressure sensitive adhesives of the acrylic acid resin types marketed by National Starch and Chemical Corporation under the designation "DURO-TAK". Compositions for pressure sensitive adhesives are described in U.S. Pat. Nos. 3,535,295; 3,677,985 and 3,806,484.

By wetting the glass surface with water or a dilute aqueous solution which contains soap or other surface-active agent, the dried coated film will stick to the wet glass by virtue of the lacquer coating (Examples 6 or 8) to sufficient extent for handling without need for an intervening adhesive applied to the glass surface. When the glass surface dries by exposure to the sun or otherwise, a fairly permanent bond is had.

On the other hand, if desired, a permanent resin adhesive solution may be applied to the clean dry glass surface and the lacquer coated face 14 of the plastic film thereby affixed to the glass. In instances where a pressure sensitive adhesive is employed at layer 14 over the metalized surface, the adhesive may be protected by a release film such as by a conventional plastic sheet of a polyester resin having a silicone release coating thereon. In application to a glass pane, the polyester resin sheet is peeled off at the silicone coating, the sheet applied to the glass surface with the PS adhesive facing the glass and after sufficiently adhered the outer plastic film 10 is peeled off, leaving the lacquered metal coating on the glass.

When no coating 14 is employed the plastic film 10 coated with the layers 11 to 13 may be applied to the glass which is previously sprayed with a thin layer of any permanent adhesive forming a clear transparent coating on glass and the outer sheet of plastic 10 peeled off as before.

By utilizing a reflective metal coating on the glass, in accordance with the present invention, as distinguished from structures wherein the metalized plastic film remains attached to the glass pane, certain of the problems heretofore encountered are avoided. When it is attempted to attach the coated plastic sheet to the glass surface, the formation of so-called "fingers" is frequently observed, as a result of unequal pressure application and/or partial delamination. Also, visible scratches resulting from handling during installation often observed in the case of glass having attached plastic film, is eliminated. Moreover, the installation thickness is reduced from approximately 25 microns to about 3 microns, as a result of which there is no film to distort upon compression or by sliding.

What is claimed:

1. The method of preparing glass window pane having thermally insulating and controlled light transmitting properties which comprises applying to one surface of the pane a coated plastic film having on the surface thereof successive layers of:

a release coating, an acrylic nitrocellulose lacquer, and a vapor deposited aluminum coating over said lacquer, with said aluminum coating facing the glass surface; adhesively attaching the thus coated plastic film to the glass pane, and peeling the plastic film from the pane as the release layer; said aluminum coating being of such thickness as to transmit 10 to 80% of incident light through the pane after peeling the plastic film therefrom.

2. The method as defined in claim 1, wherein said coated plastic film is one having a protective lacquer over said aluminum coating and said coated film is attached to the glass pane by an adhesive, prior to said peeling.

* * * * *